(12) United States Patent  (10) Patent No.: US 6,675,533 B2
Morlier et al.  (45) Date of Patent: Jan. 13, 2004

(54) WATER STORAGE DEVICE FOR USE WITH POTTED HOUSEPLANTS

(75) Inventors: Lynn W. Morlier, New Orleans, LA (US); Christopher G. Greve, Covington, LA (US); Ronald M. O'Connor, Jefferson, LA (US)

(73) Assignee: Lynn Morlier, New Orleans, LA (US)

( * ) Notice: Subject to any disclaimer, the term of this patent is extended or adjusted under 35 U.S.C. 154(b) by 0 days.

(21) Appl. No.: 10/167,610

(22) Filed: Jun. 13, 2002

(65) Prior Publication Data

US 2003/0009940 A1 Jan. 16, 2003

Related U.S. Application Data

(60) Division of application No. 09/713,316, filed on Nov. 16, 2000, which is a continuation-in-part of application No. 09/055,968, filed on Apr. 7, 1998, now Pat. No. 6,176,038
(60) Provisional application No. 60/053,578, filed on Jul. 17, 1997.

(51) Int. Cl.⁷ ............................................. A01G 25/00
(52) U.S. Cl. ..................... 47/81; 47/79; 47/59; 47/62 R
(58) Field of Search ............................. 47/59, 60, 62 R, 47/63, 64, 65.5, 65.4, 66.1, 67, 66.7, 80, 81, 79, 68

(56) References Cited

U.S. PATENT DOCUMENTS

| 320,588 A | 6/1885 | Rhoads |
| 918,563 A | 4/1909 | Lewis |
| 1,216,642 A | 2/1917 | White |
| 1,247,766 A | 11/1917 | White |
| 1,251,552 A | 1/1918 | Marks |
| 1,712,986 A | * 5/1929 | Favata |
| 1,928,810 A | 10/1933 | Burford |
| 2,072,185 A | * 3/1937 | Schein |

(List continued on next page.)

FOREIGN PATENT DOCUMENTS

| FR | 2701808 | 2/1993 | |
| GB | 1104 | 3/1875 | |
| GB | 2040659 | * 2/1979 | .......... A01G/27/00 |
| GB | 2030037 A | 8/1979 | |
| JP | 05-219845 | 2/1992 | |
| JP | 06-225651 | 8/1994 | |
| JP | 10-127177 | 5/1998 | |
| JP | 10-304783 | 11/1998 | |
| JP | 10-313713 | 12/1998 | |
| JP | 11-32602 | 2/1999 | |

Primary Examiner—Peter M. Poon
Assistant Examiner—Andrea M. Valenti
(74) Attorney, Agent, or Firm—Adam J. Cermak

(57) ABSTRACT

Water storage device for use with potted plants is disclosed. This water storage device is a liquid nutrient reservoir usable with a wick regulating element inserted into and extending from the bottom of the planting pot to the storage device for control of liquid nutrient delivery rate. The water storage device accommodates some sizing variance in potted plants and securely holds the potted plant as a coupled modular unit. The water storage device is provided with structure for hanging the coupling. Additional structure is provided for contiguous alignment of a plurality of the water storage devices with secured potted plants as well as structure for elevation of the coupling to prevent moisture damage to a setting surface.

30 Claims, 11 Drawing Sheets

U.S. PATENT DOCUMENTS

| | | | | |
|---|---|---|---|---|
| 2,810,235 A | * | 10/1957 | Magid | |
| 3,220,144 A | * | 11/1965 | Green | |
| 3,739,524 A | | 6/1973 | Rose | |
| 3,786,598 A | | 1/1974 | Stadelhofer | |
| 3,842,539 A | | 10/1974 | Sacalis | |
| 3,857,196 A | | 12/1974 | Alkire | |
| 4,048,754 A | * | 9/1977 | Laux | 47/68 |
| 4,083,146 A | | 4/1978 | Branković | |
| 4,231,187 A | | 11/1980 | Greenbaum | |
| 4,236,352 A | | 12/1980 | Heaney et al. | |
| 4,339,891 A | * | 7/1982 | Bassett | 47/71 |
| 4,407,092 A | * | 10/1983 | Ware | 47/64 |
| 4,608,835 A | * | 9/1986 | Kooy | 62/255 |
| 4,829,709 A | * | 5/1989 | Centafanti | 47/79 |
| 5,136,806 A | | 8/1992 | Kang | |
| 5,157,868 A | * | 10/1992 | Munoz | 47/40.5 |
| 5,193,305 A | | 3/1993 | Holtkamp, Jr. | |
| 5,341,596 A | | 8/1994 | Kao | |
| 5,409,510 A | * | 4/1995 | Houweling | 47/58 |
| 5,446,994 A | * | 9/1995 | Chou | 47/81 |
| 5,535,542 A | * | 7/1996 | Gardner et al. | 47/18 |
| 5,782,035 A | * | 7/1998 | Locke et al. | 47/79 |
| 5,918,415 A | | 7/1999 | Locke et al. | |
| 6,023,886 A | | 2/2000 | Momiyama et al. | |
| 6,138,411 A | * | 10/2000 | Lin | 47/79 |
| 6,176,038 B1 | | 1/2001 | Morlier | |

* cited by examiner

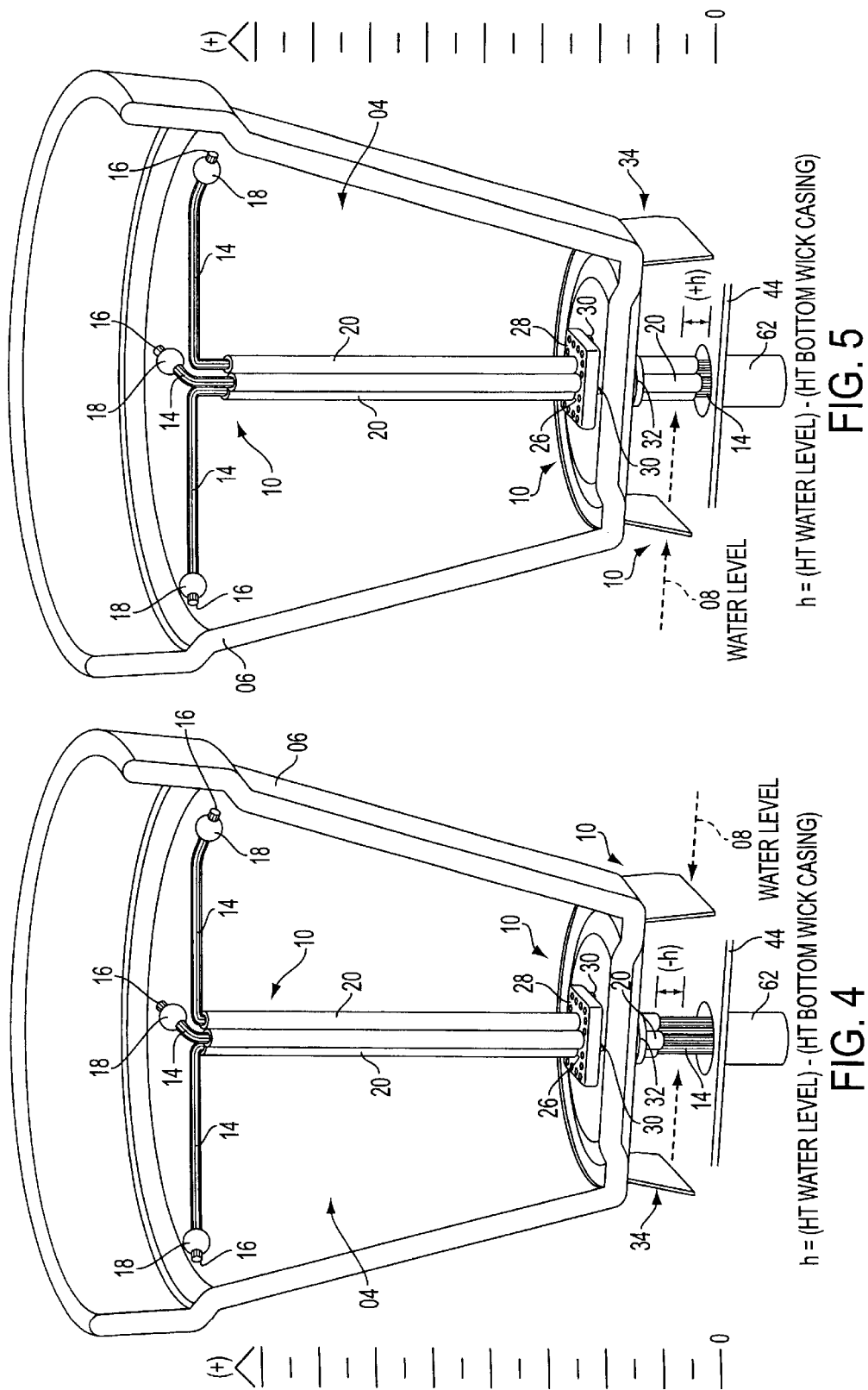

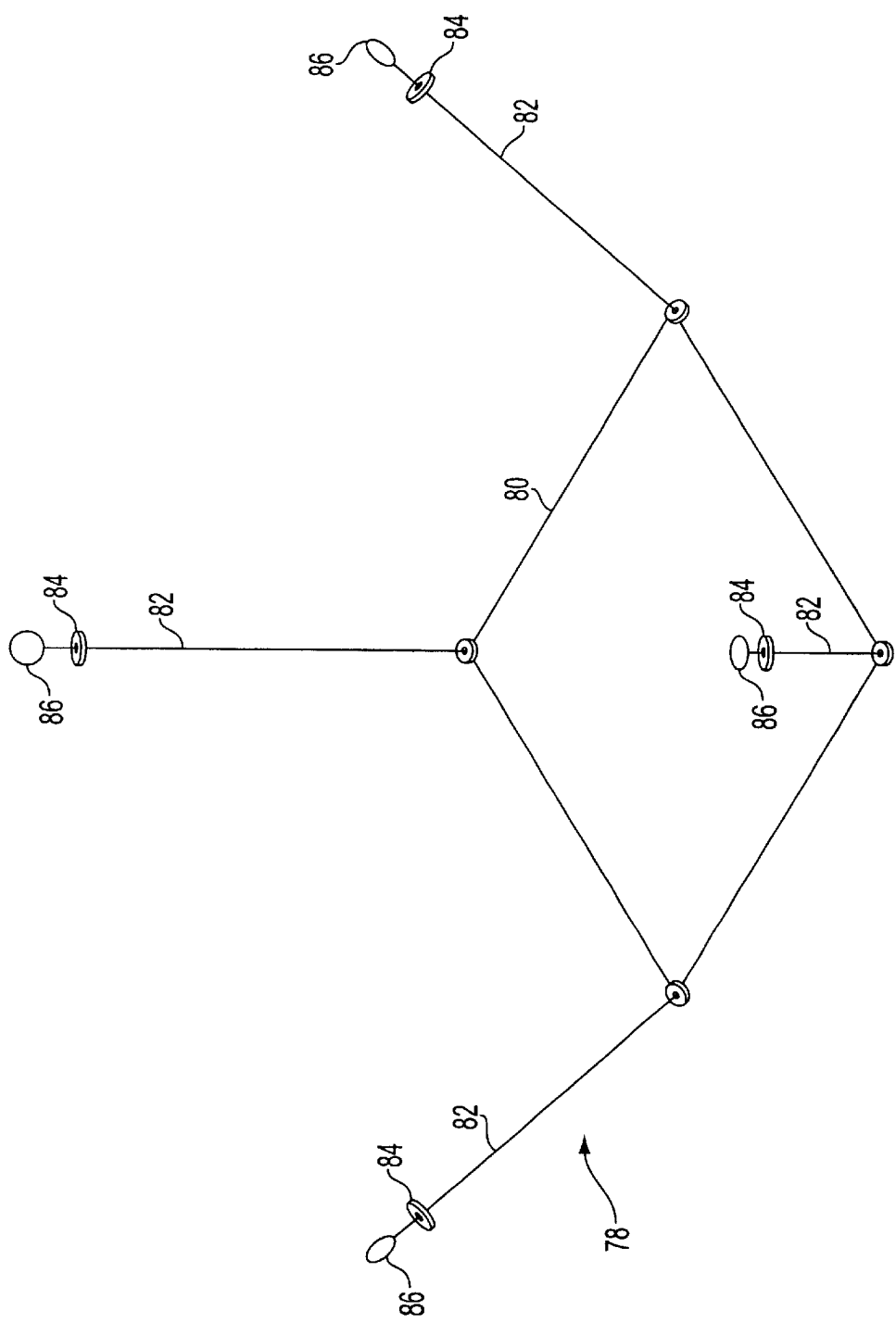

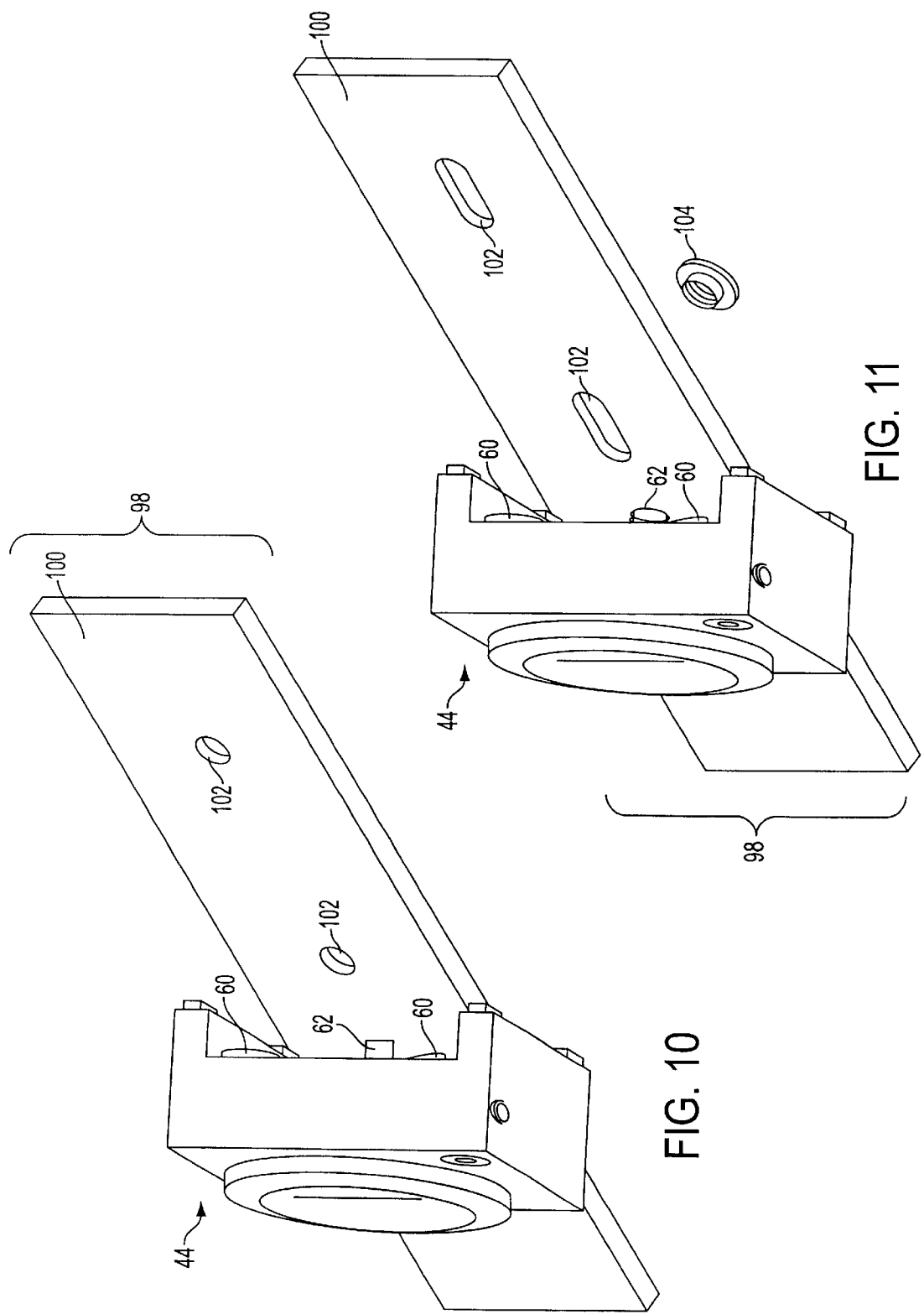

ated Nov. 16, 2000, which is a continuation-in-part of U.S.
WATER STORAGE DEVICE FOR USE WITH POTTED HOUSEPLANTS This is a divisional of application Ser. No. 09/713,316 filed Nov. 16, 2000, which is a continuation-in-part of U.S. patent application Ser. No. 09/055,968 entitled HOUSEPLANT MAINTENANCE DEVICE AND METHOD filed Apr. 7, 1998, now U.S. Pat. No. 6,176,038 and is related to Provisional Utility Patent Application Serial No. 60/053,578, filed Jul. 17, 1997, entitled HOUSEPLANT MAINTENANCE DEVICE, both of which are incorporated by reference in each of their entireties herein.

BACKGROUND OF THE INVENTION

1. Field of the Invention

The invention relates to apparatus for maintaining and using houseplants grown in containers, specifically to increasing the utility of standard clay pot containers and to maintaining and regulating the moisture level of the potting mix within a clay pot planting as well as methods of conducting nutrient cations into the growing medium of a containerized plant from nutrient rocks and powders of low aqueous solubility.

2. Brief Description of the Related Art

Clay pots have been a perennial favorite container for potted plants around the home. The porous nature of these containers allows aeration for healthy root development of growing plants. In use for centuries, some drawbacks of clay pots, such as minimal drainage, have been overcome by age-old practices of layering broken clay pieces in the pot's bottom, followed by long fiber sphagnum moss filters beneath the soil layer. Moisture maintenance is a problem however, which has not been satisfactory solved. Mature plants in appropriately sized clay pots dry quickly, due to the porosity, and must be watered more often than is required for plastic containers. Conventional practices for growing plants in clay pots include repotting the plants in successively larger clay pots at various growth stages in an effort to avoid excessive wet soil. Since this moisture cannot be used by an underdeveloped root system, the excessive moisture can cause root rot.

Moisture applications with wick devices, which use capillary action to moisten the soil, have been around for at least 125 years, yet the use with clay pots is not widespread. Many traditional wicks exhibit such problems as leaving soil in the bottom of the pot very wet, while the soil in the upper regions is very dry. The soak spots in the lower portions at times are so severe as to promote microbial growth and "root rot." With the upper portions of the soil being left so dry, roots can not be supported except through minimal depths of the soil.

Traditional wicks have been too thick for use with clay pots, and the interactive nature of wicking in response to the moisture level of the soil maybe lost if the wick is not in direct contact with dry soil. Further, the moisture addition rate is sometimes based on seepage through perforations in a cover of the wick, which may be difficult to control. Additionally, some traditional wicking materials are too large or complex to be easily incorporated into household use.

Introduction of moisture in the upper layers of soil, as happens in nature, is still the most common water addition technique to plants potted in clay. It allows for moisture distribution throughout the soil by allying two of the three forces, which move moisture in the soil: gravitational force and the capillary action of the soil itself. The third force is the energy used by the plant roots to draw in water. Nature's method of saturating the soil during a rain and letting the soil dry between rains is the mode of maintenance of most of the world's plants. Thus, we can assume that healthy plants readily tolerate, and in fact thrive, with at least some variance of moisture level within the soil. Water reservoirs associated with wicking elements have been large or cumbersome and have discouraged homeowners from using a reservoir wicking system.

Soil or plant growing medium is composed of colloids which carry a net negative charge. This is an important property because it allows the soil to hold positively charged nutrient ions or cations while negatively charged nutrients are left to leach through the soil. Calcium, magnesium, potassium, and ammonium are examples of important nutrients in cationic forms which influence the pH of the soil in a basic direction, while aluminum and hydrogen cations make the soil more acidic.

All plants need 16 to 19 elements for healthy growth, some in trace quantities, many of them are cations. Cations are also the form these nutrients enter the plant roots. Generally these cationic nutrients are added to the soil in one of two ways: as water soluble salts or as slow release materials, that is, materials that dissolve slowly in water. This latter group includes relatively aqueous insoluble rock powders and greensand. Addition of water soluble salts to containerized plantings has always been problematic because it is difficult to get a good nutrient mix at a level which both satisfies the plant's needs and does not burn the plant. Burn is caused by the salt ionized in the soil's moisture actually drawing water from the plant roots in an effort to equalize the ion levels.

Rock powders and greensand occur in nature with often excellent nutrient mixes. They are normally added directly to the soil. These relatively aqueous insoluble materials slowly dissolve and release their nutrients at rates which will not burn the plant. Often, however, it takes several years for the plant to show the benefits of the nutrients.

SUMMARY OF THE INVENTION

According to one embodiment of the present invention, a method of providing interactive delivery of liquid nutrients to the growing medium of a houseplant with the facility to set the capacity of the liquid nutrient delivery rate, comprising the steps of providing at least one wick element comprised of wicking material and casing around a central portion which holds said wicking material movably in place, wherein said casing is substantially impervious to moisture, with said wicking material exposed at either end of said casing; providing a reservoir of liquid nutrients with said reservoir having both a liquid surface level and an average liquid surface level over a fill and distribution cycle; providing a holder which secures said wick elements in position with respect to said liquid surface level with members which hold said outer casing, and allows movement of said wick elements to new secure positions with respect to the liquid surface level; positioning said wick elements in said holder; placing the wick elements, within the holder, along with a plant in growing medium inside a planting container, such that a portion of the wick elements, including both said casing and said wicking material protrude from the bottom of said planting container; and positioning said planting container with said protruding casing and wicking material above said reservoir of liquid nutrients such that the wick elements are immersed into the liquid to a position such that the bottom of said wick element casing is either above or below said liquid surface level; whereby the average liquid nutrient delivery rate capacity is set by the position of the wick elements within the holder, with respect to a given reservoir and average liquid surface level over a fill and delivery cycle, to the optimal range of liquid nutrient delivery rates for a specific plant, at its current growth stage, in its current environment, within the maintenance schedule of its current caregiver.

According to another embodiment of the present invention, a regulating wick device, usable with a liquid nutrient reservoir having a liquid surface level, said regulating wick device both for conducting nutrients, selected from a group consisting of water, plant fertilizers, antimicrobial agents, plant hormones, and mixtures thereof, and for setting and adjusting wicking rate to an elevated growing medium of a plant comprising at least one wick element comprised of a length of wicking material and a casing around a central portion thereof, said casing being substantially impervious to moisture, wherein said wicking material is exposed at either end of said casing; and a holder capable of positioning securely at least one of said wick elements so that said wick element is both immersed within said reservoir and extends upward into said elevated growing medium, thereby fixing the position of said wick element with respect to said liquid surface level with members which both hold said casing and allow movement of said wick element casing within said holder to new secure positions with respect to the liquid nutrient level.

According to yet another embodiment of the present invention, a water storage device usable with a wick device inserted into and extending from the bottom surface of a planting pot with means for orderly contiguous alignment of a plurality of said water storage devices and a means for elevation to prevent moisture damage to a setting surface such as fine furniture comprising a base having a housing and comprising an interior which forms a reservoir in said base for sealingly holding liquid nutrients; a top comprising an opening therein which communicates said reservoir with the exterior of said base; a compliant member or gasket for supporting the planting pot therein having an exterior shape similar to the said base top opening; an interior shelf for supporting the bottom of said compliant member; an alignment mechanism on the bottom of said water storage device for aligning a plurality of said water storage devices contiguously on a horizontal plane; a plurality of elevated support members on the bottom of said device of substantially equal length to support perpendicularly the bottom of said water storage device to space apart the moisture containing base from the setting surface; a drainage portal in the side of said base to allow said water storage device to be used outdoors during seasons of adequate rainfall to maintain only a predetermined water level and with an optional closure for indoor use which is substantially clear and functions as a fill level sight; and a liquid nutrient addition portal substantially above the water level for adding liquid nutrients directly into the reservoir.

According to still another embodiment of the present invention, a method of conducting nutrient cations sourced in relatively aqueous insoluble solids into the soil of a containerized houseplant comprising the steps of providing a wick element comprising wicking material which both conducts moisture and is chemically bonded as a cation exchanger, which provides negatively charged sites on said wicking material, said wick element further comprising a casing which surrounds the wicking material and exposes the wicking material at either end of said casing; placing the wick element in the soil along with a plant in a planting container such that both wicking material and casing protrude from the bottom of said planting container; providing an aqueous reservoir to which the relatively water insoluble nutrients have been added and to which water has been added creating a liquid surface level; and positioning said planting container with said protruding wick elements above said aqueous reservoir with said nutrients such that the wick elements are immersed below said liquid surface level in the reservoir; whereby dissociation of the nutrients in the reservoir produce cations which are attracted to the negative sites on the exposed wicking material and the wicking action of the moisture driving up the wick exchanges the cations upward into the soil encouraging more dissociation of the nutrient solid.

According to yet another embodiment of the present invention, a wick element for conducting nutrient cations from an aqueous reservoir to an elevated growing medium of a containerized houseplant comprising wicking material which both conducts moisture and is chemically bonded as a cation exchanger, adding sites with a negative charge in the wicking material, and a casing surrounding said wicking material with said wicking material exposed on both ends of said casement.

Still other objects, features, and attendant advantages of the present invention will become apparent to those skilled in the art from a reading of the following detailed description of embodiments constructed in accordance therewith, when taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which:

FIG. 4 illustrates a cross sectional view of a regulating wick device in a drier soil configuration;

FIG. 5 illustrates a cross sectional view of the regulating wick devices of FIG. 4, in a wetter soil configuration;

FIG. 7 is a view of part of the hanging mechanism, the interior pot support for hanging the modular potted plant which fits inside the water storage device;

FIG. 10 is an exploded view of the modular alignment mechanism of the present invention;

FIG. 11 is an exploded view of an alternate form of the modular alignment mechanism of the present invention;

Figure 1:
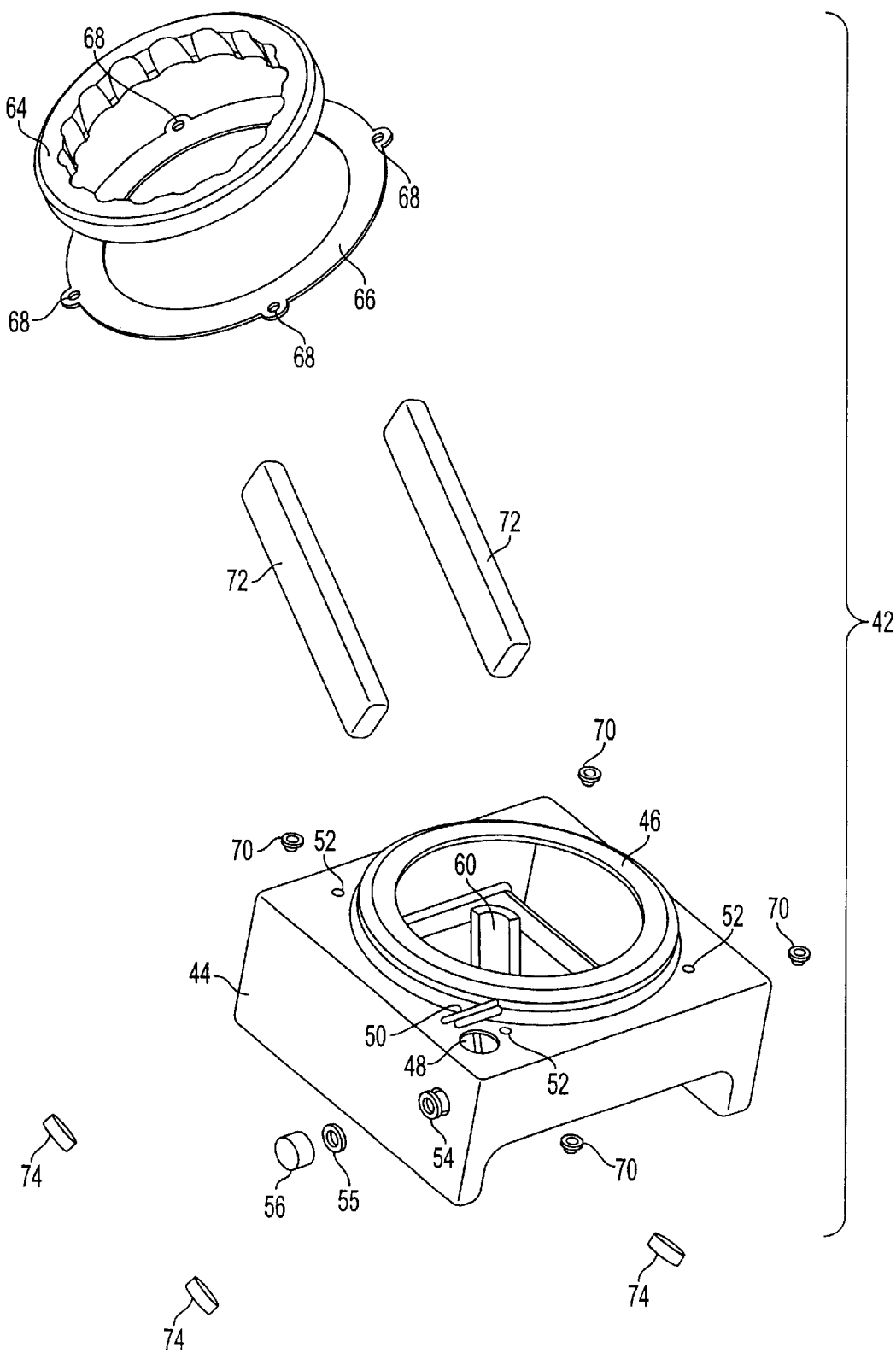
FIG. 1 illustrates an exploded perspective view of the water storage device assembly.

| Reference Numerals In Drawings | |
| --- | --- |
| 02 | growing plant |
| 03 | plant roots |
| 04 | growing medium (soil) |
| 05 | insoluble nutrients |
| 06 | planting pot (clay pot) |
| 08 | liquid nutrient level (water level) |
| 09 | release solution |
| 10 | Regulating Wick Device |
| 12 | Wick Element(s) |
| 14 | wicking material (fiber) |
| 15 | wedge-shaped filament |
| 16 | upper knot |
| 17 | core |
| 18 | bead |
| 20 | casing |
| 21 | membrane covering |
| 22 | Wick Element Holder (Wick Element Clamp) |
| 24 | upper member of wick element clamp |
| 26 | pressure fitting orifices |
| 28 | perforated or porous upper surface |
| 30 | ridged undersurface |
| 32 | threaded neck |
| 34 | pot stand (clamp nut) |
| 36 | planar upper portion on which pot sits |
| 38 | female opening to fit threaded neck of wick clamp |
| 40 | pot stand legs |
| 42 | The Water Storage Device (reservoir) |
| 44 | Base housing with top opening (reservoir with top opening) |
| 46 | raised lip around top opening |
| 48 | water addition orifice |
| 50 | snap lid for water addition orifice |
| 52 | opening(s) for connection device (grommet openings) |
| 54 | drainage port |
| 55 | drainage port gasket |
| 56 | optional closure for drainage port/water level sightings |
| 58 | retaining ridges for ballooned implants |
| 60 | drainage trough(s) (level sitting surface) |
| 61 | sloped bottom surface |
| 62 | reservoir well |
| 64 | compliant member for pot support (gasket) |
| 66 | interior shelf for gasket support (gasket retaining ring) |
| 68 | holes for connection device (grommet holes) |
| 70 | connection device (grommet connections) |
| 72 | ballooned leg implants for hollow legs |
| 74 | elevated support members (reservoir rising feet) |
| 76 | The Hanging Mechanism (optional use) |
| 78 | Interior Pot Support |
| 80 | pot seat |
| 82 | connecting leg(s) |
| 84 | leg expansions or grommet stop pin(s) |
| 86 | hanging fixtures (loop connector(s)) |
| 88 | Exterior Hanger |
| 90 | C-hook(s) |
| 92 | loop retaining seat(s) |
| 94 | wire hanging leg(s) |
| 96 | hanging hook |
| 98 | Modular Alignment Mechanism (optional use) |

| Reference Numerals In Drawings | |
| --- | --- |
| 100 | Alignment Plank |
| 102 | Holes accommodating reservoir well |
| 104 | Nut securing reservoir well |

DETAILED DESCRIPTION OF THE PREFERRED EMBODIMENTS

Referring to the drawing Figures, like reference numerals designate identical or corresponding elements throughout the several Figures.

The present invention provides a simple method of controlling moisture levels, moisture distribution throughout soil layers and adjustment of moisture delivery rate to the growing medium within a clay pot. The present invention is intended to enhance the utility of modular self contained plantings in clay pots by adding hanging utility, alignment utility, i.e., for window boxes, and elevation for use on fine furniture. Though these devices were developed for ordinary clay pots, they may also be used with other containers of appropriate size and shape. These devices may be especially appropriate for other porous containers like the currently popular coco-fiber or peat products. Likewise, though the present wick invention was primarily designed for the delivery of moisture to the growing medium of a houseplant, other liquid nutrients may also be conducted depending on the wicking material and nutrient.

The present wick invention is based on observations of working with covered wick devices and overcomes deficiencies of the prior art. The wick is based on moisture introduction in the upper soil just below the soil surface. Though moisture added to the bottom soil of a potted container may move upward to plant roots by the capillary action of the soil, moisture distribution is more even, and soak spots are overcome with introduction of moisture to the upper soil. Observations of upper soil moisture introduction made by moving moisture meters to various depths of soil show the maximum moisture levels still occur in the bottom soil, though the soil above is not saturated. Thus, controlling moisture in the upper soil controls the minimum level of soil saturation, with a gradual and increasing distribution to the lower soil. This mode of moisture distribution allows a cache of moisture storage in the upper soil and allows more root development through the available depth of soil. In theory, many factors influence the rate of moisture wicking by covered wicks, including: (1) height the wick extends from the water reservoir, (2) area of exposure of the wicking element outside its casement within the soil, and (3) number of wicks placed in the soil.

Observation of covered wicks and adjusting various factors, finds that the greatest determinant of wicking rate is the height of the bottom wick casing relative to the water surface in the reservoir, a somewhat surprising result. Therefore, one aspect of the wick of the present invention is based on wicking rate regulation by sliding the wick casement higher or lower relative to the water level. A special flow-through clamp, which maximizes drainage and facilitates the sliding action of the wick casement, is presented as part of the regulating wick device of this invention. Thus the regulating wick device of this invention is easily used with a clay pot, provides the optimum moisture distribution throughout the soil depth, and provides slow moisture delivery, up to 4 weeks or more under indoor conditions. The regulating wick device of this invention adds to the art a simple way to achieve moisture modulation according to the needs of the specific plant. Modulation ability is added to easily increase or decrease the rate of moisture delivery, even after the plant is potted, at various periods throughout its growth. The regulating wick device of the present invention is amenable to low cost manufacture and sale.

The present regulating wick device includes a number of wick elements, typically 3 for 21 cm (8") pots, and a wick element clamp. The wick elements are preferably formed of rolled microfiber wicking material, and casing. Generally, an upper knot with a bead has been added to find wicks for adjustment in the upper soil. The wick element clamp is formed of an upper member positioned in the bottom interior of the pot, a hollow neck threaded on the outside, and a pot stand. The upper member of the wick element clamp features a flat square or other ergonomic shape for twisting with partial holes which pressure fit the wick elements in vertical position. The texture of the upper member is perforated or porous and the bottom surface of the upper member is ribbed or gridded to allow moisture drainage. The hollow threaded neck is connected to the upper member of the wick element clamp and fits through the bottom hole of the clay pot, holding the wick elements in its interior. The pot stand has a planar upper surface which also may be perforated featuring a female opening which fits the threaded neck of the wick element clamp. Finally the pot stand portion of the wick element clamp features legs which hold the pot approximately an inch and a half or so off the bottom of the floor of the water reservoir.

The objectives of the present water storage invention usable with the regulating wick device are similar to those presented in the aforementioned '968 application. The present water storage device works with the regulating wick device and clay pots, serves as water storage, and transforms the clay pot into a plant growing container of greater utility with arrangement for hanging, alignment of modular pots, and elevation for setting on fine furniture. The device fits variances within nominal standards (i.e. all 21 cm or 8" pots). The device is designed for low cost manufacture and sale. Modifications to the water storage device presented in this application allow the device to be stronger and easier to manufacture, while retaining the full functionality of the original design.

Several aspects of the water storage invention may be summarized as follows. The complete device includes the water reservoir, and optionally, the hanging mechanism and the modular alignment mechanism. The water reservoir includes a cubic-like base with a top opening, a compliant beveled gasket, the metal retaining ring for a beveled gasket, grommets which connect the metal retaining ring to the top of the cubic reservoir, ballooned leg implants for the reservoir legs, and elevating feet for the reservoir. The cubic-shaped base features a raised lip around the top opening, a water addition orifice with closure, openings for the grommet connections, drainage port with optional closure, interior retaining ridges for the ballooned leg implants, and a reservoir well in the bottom of the device. The hanging mechanism includes an interior pot support and an exterior hanger. These pieces are attached when the unit is to be hung. The interior pot support features a square wire pot seat, which accepts the pot stand attached to the planting pot as described above, wire connecting leg(s), grommet stop pin(s) or expansions, and loop connectors. The exterior hanger features a C-hook with loop retaining seat(s), wire hanging leg(s), and a hanging hook. When modular units are to be aligned to affect window box arrangements, an alignment plank is used which features precision positioned holes accommodating the reservoir well.

The method of nutrient addition from relatively aqueous insoluble rocks or powders involves, instead of adding the insoluble rocks and powders into the soil, adding them to an aqueous reservoir below the soil. In this way more ionic dissociation is encouraged simply because there is more water surrounding the nutrient solids in which to dissociate into ions. A wick is provided having as wicking material a moisture conducting substance chemically treated as a cation exchanger, meaning the wicking material carries sites which have a negative charge. Nutrient cations are drawn to the wick and are collected and concentrated on the wick. The constant wicking action upward drives the exchange of cations upward. Thus the cations are taken out of the reservoir solution. By Le Chatelier's Principle this encourages more dissociation of the nutrient solids into ions for cation collection.

This phase of the method is called the collection step. It takes place over a relatively long period of time in the reservoir solution of relatively low ionic strength. Actually during this step some nutrient cations are driven into the soil with the constant wicking of moisture upward. Many nutrient cations remain on the wick however. After the long period of collection, a release phase is commenced in which the bottom of the wick is immersed into a solution of relatively high ionic strength for a short period of time. Numerous cations in the release solution exchange the collected cations on the wick and are driven upward and into the negatively charged soil for distribution by the cation exchange capacity of the soil to the plant roots. The accompanying drawings and specification detail further aspects of the method.

Figure 2:
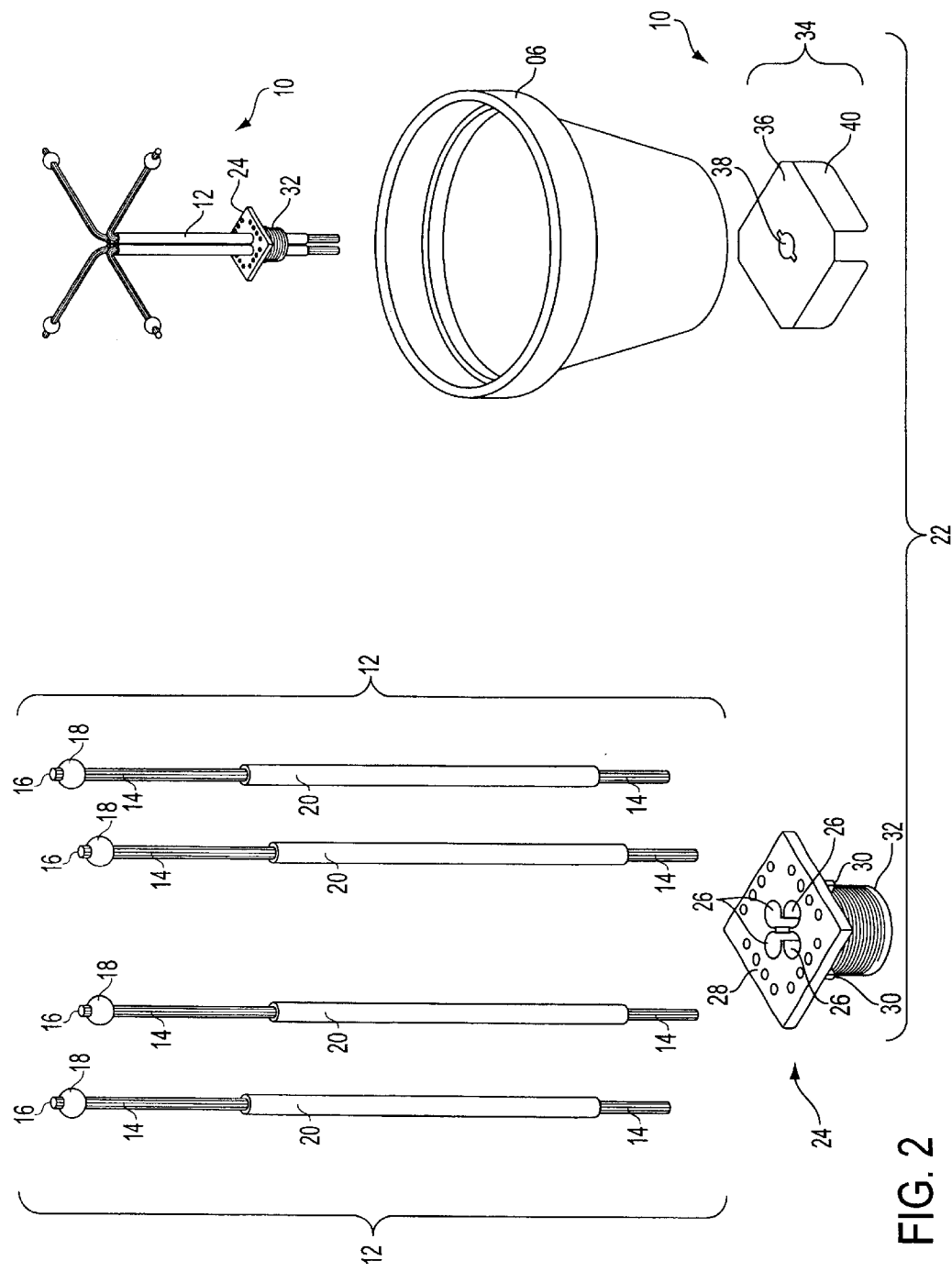
FIG. 2 illustrates an exploded and partially assembled view of the regulating wick device assembly according to the present invention.
Figure 3:
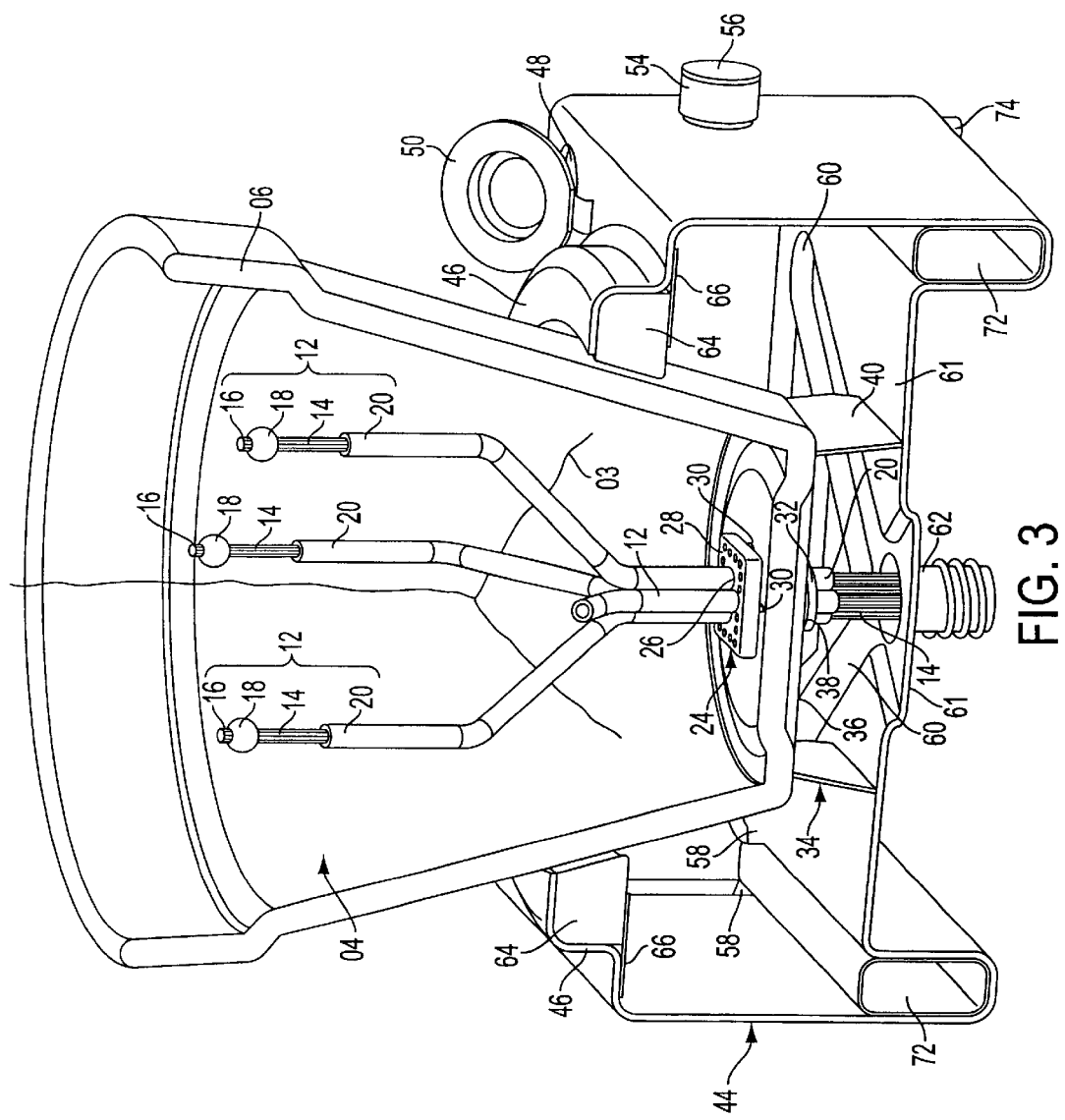
FIG. 3 illustrates a cross-sectional composite view of the water storage device and regulating wick device in use according to the present invention.

A preferred embodiment is illustrated in FIGS. 1–3 describing the low maintenance moisture delivery to a plant potted in clay. FIG. 1 illustrates an exploded view of the water storage device 42. The assembly preferably includes a water reservoir 44, ballooned leg implants 72, a gasket retaining ring 66 which is the interior shelf for gasket support, a compliant gasket ring for pot support 64, and elevated support members or rising feet for the reservoir 74. The water reservoir preferably is a rotocasted piece and features a raised lip 46 around the top opening, and water addition orifice 48 with snap lid 50, openings toward the top corners 52 for grommets 70 connections. The water reservoir 44 also preferably features a drainage port 54 to permit water above a predetermined level to flow out of the reservoir, the port including a gasket 55 and a clear optional closure for water level sightings 56. The bottom of the reservoir 44 preferably features drainage troughs 60 and a sloped bottom surface 61 inclined toward the center. The drainage troughs 60 provide a level sitting surface and add strength to the reservoir bottom. FIG. 3 shows two other preferred features of the reservoir 44, the retaining ridges 58 for the ballooned leg implants 72, and the reservoir's bottom well 62. Elevated support members 74 are preferably added to each of the four corners of the reservoir 44. The ballooned leg implants 72, which may be blow molded, are preferably snap placed in the hollow legs of the reservoir and held by the retaining ridges 58. The gasket retaining ring 66, preferably a sheet metal piece thick enough to add strength to the top of the reservoir, is preferably placed through the reservoir's top opening and acts as a mounting ring in some embodiments of the present invention. The ring may be one piece or several pieces connected together. It may have support tabs which fit the top of the reservoir. The retaining ring 66 preferably has openings 68 for grommets 70, which connect the retaining ring to the top of the reservoir. The gasket ring for pot support 64 is preferably made of foamed rubber or soft plastic material. The compliant gasket ring 64 is preferably placed between the retaining ring 66 and the raised lip 46 of the water reservoir 44. The gasket ring 64 may be scalloped for additional aeration around the inside ring, which preferably holds the clay pot. The inside of the gasket ring 64 is preferably beveled to accommodate both the shape and variances within the nominal clay pot standard sizes.

The water storage device 42 preferably sits below the clay pot 06, which is held in the beveled gasket ring 64 as shown in FIG. 3. The device may be used both indoors and outdoors. When in use outdoors, especially during periods of adequate rainfall, it is advisable to remove the drainage cover so that rain in excess of the designed recommended amount flows through the device without drowning the plant. Indoors or during drought periods the cover may be placed on the drain port for longer moisture delivery and for sighting the recommended water fill level 08. The water fill level 08 is shown in FIGS. 4, 5, 15 and 16.

When potting a plant using an embodiment of the present invention one step is to assemble the regulating wick device 10 shown in FIG. 2. Depending on the soil moisture preferences of the plant to be potted, preferably 1–4 wick elements 12 are pressed into the upper member 24 of the wick element clamp 22 through the partial openings 26, which preferably pressure fit the wick elements 12 and hold them in vertical position. The higher the vertical position the wick element 12 is held, the slower the moisture delivery through the wick element.

Figure 17:
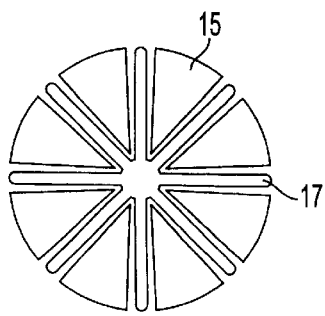
FIG. 17 illustrates a cross-sectional view of a portion of a regulating wick.

The wick elements 12 include wicking material 14, preferably formed of rolled microfiber, preferably a non-woven, star structure type as shown in FIG. 17. The microfiber preferably has wedge-shaped polyester filaments 15 and a core 17 of nylon where the water-attracting polymers are woven into masses of tiny hooks and loops. An example of this type of microfiber is currently sold for use as cleaning clothes and is available from Blom Enterprises, 8425 West $3^{rd}$ Street, Suite 310, Los Angeles, Calif. 90048 (www.ecostarmicrofiber.com) or other sources.

A wick element 12 further includes a casing 20. The casing 20 is preferably stainless or plastic tubing. The casing 20 forms a moisture impervious barrier that restricts the release of the moisture traveling upward through the wick to the upper end of the casing 20 at the point the wicking material 14 is exposed in the upper soil generally above the plant roots 03. A knot 16 with a brightly colored bead 18 is preferably added at the upper end of the wicking material 14 at the top of each wick element 12. These features allow the wick elements to be easily found in the upper soil for tactile monitoring and adjustment.

The wick elements 12 may be bent for more moisture introduction toward the outside of the pots shown in FIG. 3 or the wick elements may be straight as shown in FIG. 2. The straight wick elements with straight casings are preferable for indoor/outdoor rotational use because the moisture delivery rate is more easily adjusted after potting the plant. For example, if it is desired to move a potted plant from indoors to outdoors where sunlight, heat, and moisture evaporation are expected to be higher, the interactive wicking will self adjust to some extent in response to the dryer conditions of the potted soil. The new conditions however may be such that the wicking capacity is at maximum and should be increased. Simply sliding the smooth wick casing downward does this. With the straight wick casings, no new volume of soil is displaced making the adjustment operation easier. Adjustments of this kind may be made in pots planted with seedlings. As the small plants grow requiring more water, the wicks can be adjusted downward rather than repotting the plant from smaller to larger pots.

Drainage in container gardening of any kind is very important. The bottom holes of clay pots are regarded as minimal drainage in most situations. To use the regulating wick device the age old practices of increasing drainage by layering broken clay, followed by long-fiber sphagnum moss, which acts as a soil filter, are encouraged. In a preferred embodiment of the invention, the regulating wick is designed to not impede drainage. The upper member of the wick element clamp 24, which sits inside the clay pot, preferably features a perforated or porous upper surface 28 and a ridged undersurface 30 to affect a flow-through member.

The upper member of the wick element clamp 24 is preferably connected to the threaded neck 32, which is hollow on the inside and acts as a passage for the wick elements 12 through the bottom hole of the clay pot 06. The outside of the threaded neck 32 preferably contains screw threads, which form the male member for the pot stand 34 with the female opening 38. The upper member of the wick element clamp 24 is preferably screwed into the pot stand 34 on the threaded neck 32 of the wick element clamp incorporating the bottom of the clay pot 06. Other means of attachment will be readily apparent. The upper portion 36 of the pot stand 34 may be perforated for enhanced drainage. The clay pot 06 with protruding wick elements 12 may now stand upright on a horizontal surface sitting on the planar upper portion 36 of the pot stand 34 with the wick elements held in place through the bottom of the pot. The legs 40 of the pot stand 34 preferably hold the pot up off the surface. The upright pot may now be planted as usual with broken clay pieces, sphagnum moss, soil 04, and plant 02, then watered to start the system. The upper ends of the wick elements 12 are preferably spread evenly across the top of the soil, then pressed into the soil. Finally a mulch layer of plastic, moss or both preferably covers the upper wick elements. The potted plant with wick elements is set into the water storage device 42 as shown in FIG. 3. Water is poured through the water addition orifice 48 to a level 08 viewed through the drainage port closure/sighting port 56. Outside during periods of sufficient rainfall, closure 56 is preferably left off the drainage port 54 and water is preferably added until it is observed flowing out of the drainage port 54.

Preferably, embodiments of the water storage device 42 are aesthetically sized for modular window box arrangements further discussed below. The water storage capacity beneath a 21 cm (8 inch) clay pot is approximately 1.3 liters (1.4 quarts) per 2.5 cm (inch). The legs of the pot stand are preferably sized slightly higher. Preferably, the drainage troughs 60 and sloped bottom surface 61 direct the water stored into the reservoir's bottom well 62, making all stored water available for wicking. The vertical positioning of the wick elements 12 would determine the flow rate capacity sufficient to sustain the plant as long as possible. Two to four weeks are commonly observed with indoor plants. The flow rate capacity of moisture delivery declines slowly as the water level drops during the course of delivery and would increase immediately after filling, raising the water level. The actual rate of flow depends not only on flow capacity but also on the interactive wicking in the top of the soil. If environmental conditions or rate of plant growth induced greater moisture demand, the relatively drier soil 04 surrounding the exposed wicking fiber 14 would induce a faster rate of wicking up to the wicking capacity set by the wick element's vertical position. Thus water usage may not be the same water fill to water fill, but the wicking delivery has been optimized by the plant itself. It doesn't matter if the wicking capacity ebbs and flows with the height of the water level as happens in nature for example with the water table between rainfalls. The point is to provide adequate available moisture delivery for a sufficiently long enough time, so that manual filling and adjustments are necessary only at infrequent periods. Adjustments are made by observing the plant for evidence of stress and noting the amount of water required to bring the water level to the fill level. If either observation indicates the moisture delivery rate capacity is not sufficient, lowering the position of the wick casing and adding extra water to obtain the same adjustment period brings the plant back to optimum maintenance. Observations indicating that the plant is getting too much water include yellowing of leaves, wet soil 04, yet sufficient water levels. Adjustment of the wicks upward decreases the moisture flow capacity and slows the rate of moisture delivery. These are quick, easy, relatively infrequent adjustments producing long-lived healthy plants.

A preferred embodiment of the invention uses smooth sliding wick elements within a wick element clamp as the regulating wick device 10. Wicks positioned in water as they would be in a planting may take approximately 24 hours to fully hydrate. By lowering the wicks deeper into the water, hydration can be achieved many times faster. Once hydration is achieved, it can be maintained by returning the wick to its original position. In other words, there is not a difference in the hydration outcome based on the depth of the wick in water, only the rate at which it is achieved. There is also a dramatic difference in the rate of full hydration depending on whether the lower end of the wick casing 20 is below the water level or above it. Hydration rate is dramatically faster if the bottom of the wick casing 20 is below the water level 08. The idea of wicking rate capacity helps solve a problem of maintaining plants which like a relatively dry pot. "Planting high", which means positioning the wick elements relatively high in the wick element clamp with the bottom of the wick casing 20 above the water level, produces even but definitely drier moisture levels, preferred by these plants. Using the concept of wicking rate capacity as a regulating technique is one if the advantageous features of the present invention.

FIG. 4 contains growing medium 4 which is relatively drier than that of FIG. 5, which contains growing medium 4 which is relatively wetter. Each pot could presumably contain plants preferring maintenance of the conditions illustrated. Focusing on the wick casing bottom of each Figure for comparison, h is defined as the difference between the height of the water level 08 and the height of the bottom of the wick casing 20. In FIG. 4 as illustrated the wick casing 20 sits above the current water level 08. The h in this case is negative by approximately, 6 mm. In FIG. 5 as illustrated the bottom of the wick casing 20 is immersed below the surface of the water 08. The h is positive by approximately 6 mm. All other factors such as number of wicks, wicking fiber 14, surface area of exposed wick in the potting mix 04, length of casing 20, water level delta between low point and fill, are the same. There is a difference of about 12 mm in the height between the water surface and the height of the top of the wick casing in FIG. 4 which is greater than FIG. 5. This difference of 12 mm, however, does not account for the dramatic difference in the wicking rates of the two pots.

One may assume that in FIG. 5 there is a "straw effect" of an open tube in water, a phenomenon commonly observed as children drinking sodas, called capillarity by physicist. This is the rise of water in the tube due to the surface tension between the water and the tube itself. Moreover in a column packed with fiber, this effect will be more pronounced. One may also assume that wicking within the tube is much more efficient than wicking outside it. In FIG. 4 as moisture is drawn from the water surface it is free to evaporate or move upward along the capillary fiber. Some moisture is lost before it reaches the mouth of the casing. Once inside the casing 20 moisture merely refluxes within the tube on or off the wicking fiber but capillary action continually driving the moisture upward. Thus the amount of moisture carried into the bottom of the casing is integral to the capacity to move moisture upward. Both capillarity and wicking efficiency are connected to the value of h. As h increases both capillarity and efficiency increases; the wicking capacity dramatically increases.

Figure 6:
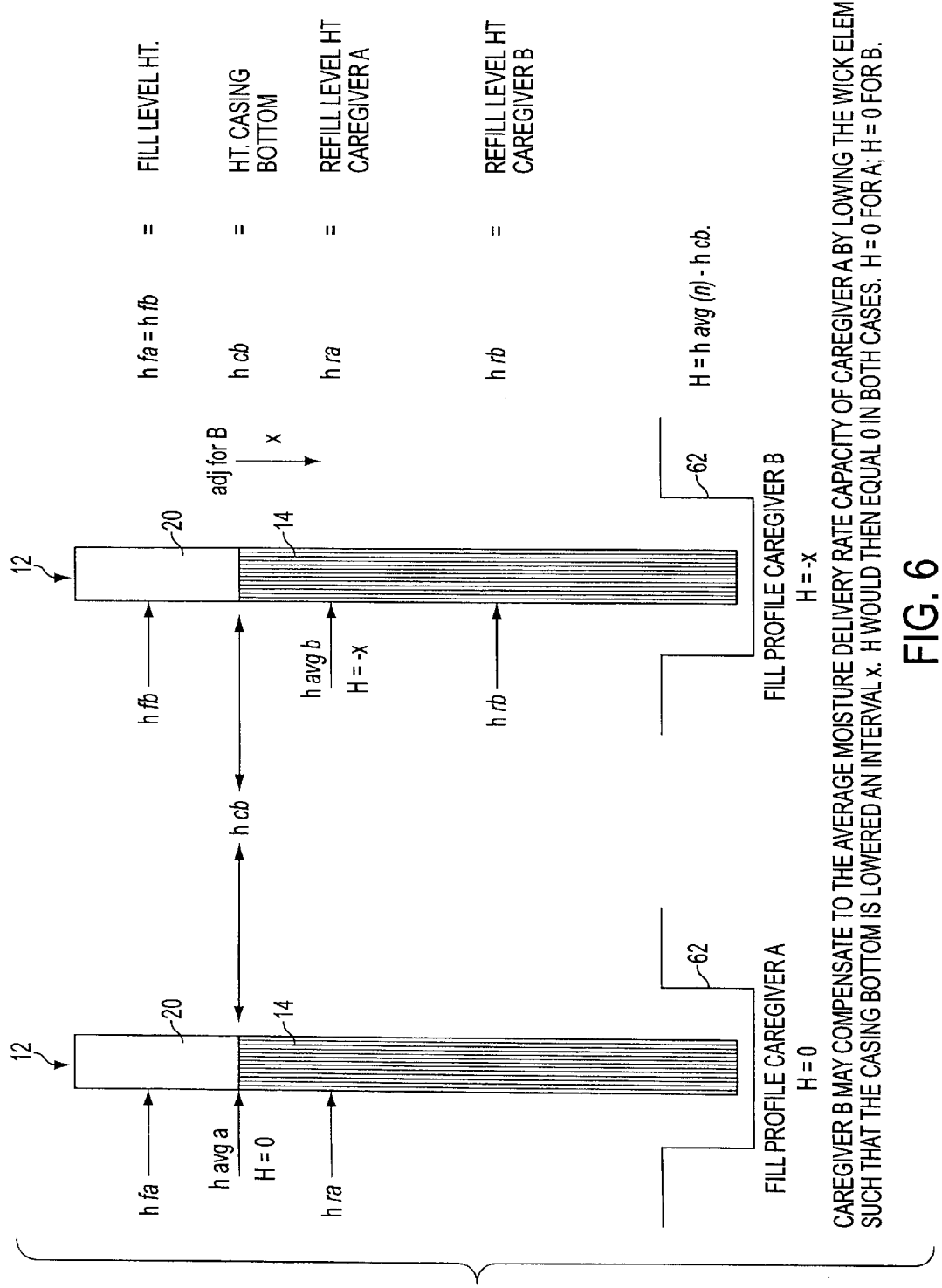
FIG. 6 is a schematic view of the lower portions of two wick elements within a water storage device.

FIG. 6 illustrates how the maintenance habits of individual plant caregivers can be compensated by adjustment of the vertical position of the wick element. FIG. 6 shows the lower portions of two wick elements 12 showing both casings 20 and wicking fiber 14. For purposes of this discussion assume the two wick elements are protruding from the bottom of a potted plant into a water storage device with well 62. The water fill level is the same for both storage devices. Further assume a fastidious plant caregiver A who frequently checks the water level inside the water storage device and refills the water at point $h_{ra}$, refill level height for caregiver A. In this case, over the course of the fill/distribution cycle, the water level varies equally above and below the bottom of the wick casing, $h_{cb}$, height of the wick casing bottom. We can define the important quantity H based on the average height of the water level over the fill/distribution cycle. H equals the difference in the average height of the water level over the fill cycle minus the height of the bottom casing. $H=h_{avg\ a}-h_{cb}$. The quantity H would be zero in the case of caregiver A. Assume a second caregiver B who we shall describe as less than fastidious in the maintenance of the same plant, with the same reservoir and water fill level $h_f$; $h_{fa}=h_{fb}$. Caregiver B checks the water level much less frequently and refills the reservoir only when the water level reaches a much lower level, $h_{rb}$, refill level height for caregiver B. In this case the water level varies unequally above and below the bottom of the wick casing, $h_{cb}$. The average water level over the fill/distribution cycle is below the bottom of the wick casing and the important quantity H is negative by a height interval x. $H=h_{avg\ b}-h_{cb}=-x$.

Caregiver B could adjust the height of the bottom of the wick casing by simply sliding the wick element downward by an interval x. After the adjustment the important quantity H would be zero for caregiver B. $H=h_{avg\ b}-h_{cb}=0$. Thus after the adjustment the average wicking capacity over the course of the fill/distribution cycle would be the same for both caregivers A and B. It is true that in the case of caregiver B the amplitude of the wet cycle would be relatively wetter and the dry cycle relatively drier. However as previously mentioned, nature teaches the ultimate wet and dry cycles in the application of moisture to the roots of most of the world's plants.

Since the available water depths are the same in all water storage devices sized for a nominal standard, and fill frequencies are to be standardized for the caregiver's easy maintenance schedule, finding a good vertical position of the wicking elements 12 is all that is necessary for optimal moisture application. There is an optimum vertical position suitable to the needs of the plant in its current environment and growth stage. For most plants positioning the wick elements such that the casing is slightly below the water surface at fill level produces slowly developing moist and dry cycles between fillings as the water level drops and h decreases. These cycles are much gentler and more regular than is usually possible in nature.

Figure 8:
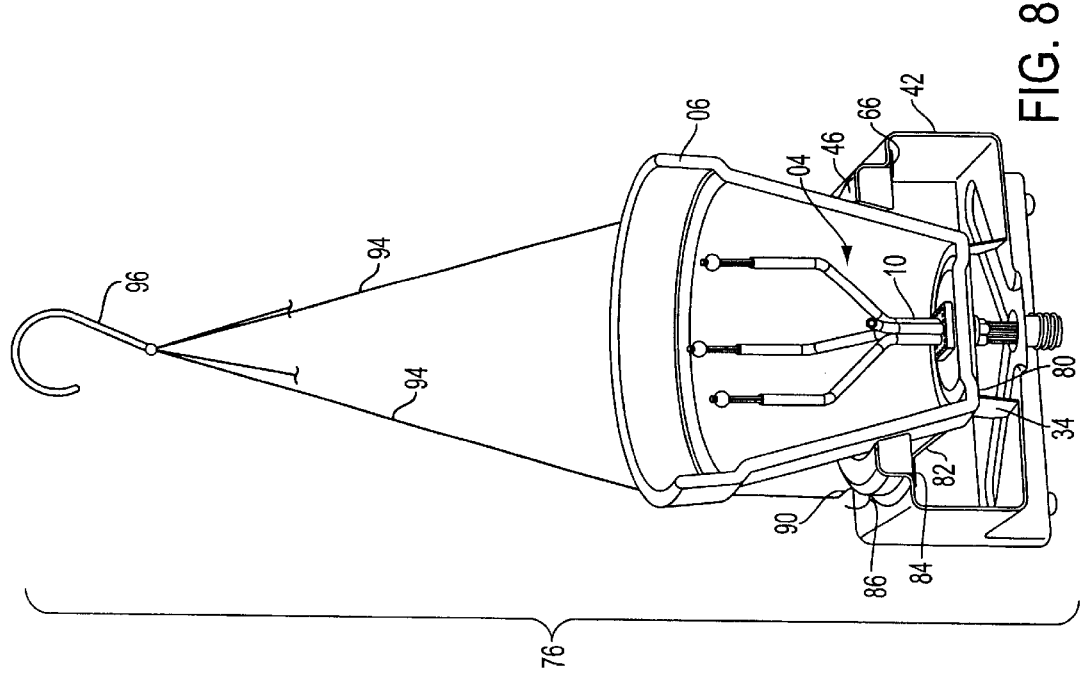
FIG. 8 is a composite cross sectional view of the hanging mechanism including both the internal and external mounting assemblies and their relationship to the water storage device for hanging the modular potted plant according to the present invention.

FIG. 8 shows a hanging mechanism for a potted plant in clay, with regulating wick device and water storage device. The hanging mechanism 76 includes both an interior pot support 78 featured in FIG. 7 and the external hanger 88 illustrated in FIG. 9 with the pot and water storage device. The interior pot support 78 illustrated in FIG. 7 is preferably constructed of sturdy wire or twisted wire. The internal pot support 78 contains a pot seat 80, square shaped in this case, and legs 82 attached at each corner of the pot seat 80. The legs 82 are also feature leg expansions 84 (i.e. grommet stop pins or bent out portions of the legs 82), and ultimately connect to hanging fixtures 86 (i.e. loop connectors).

Figure 9:
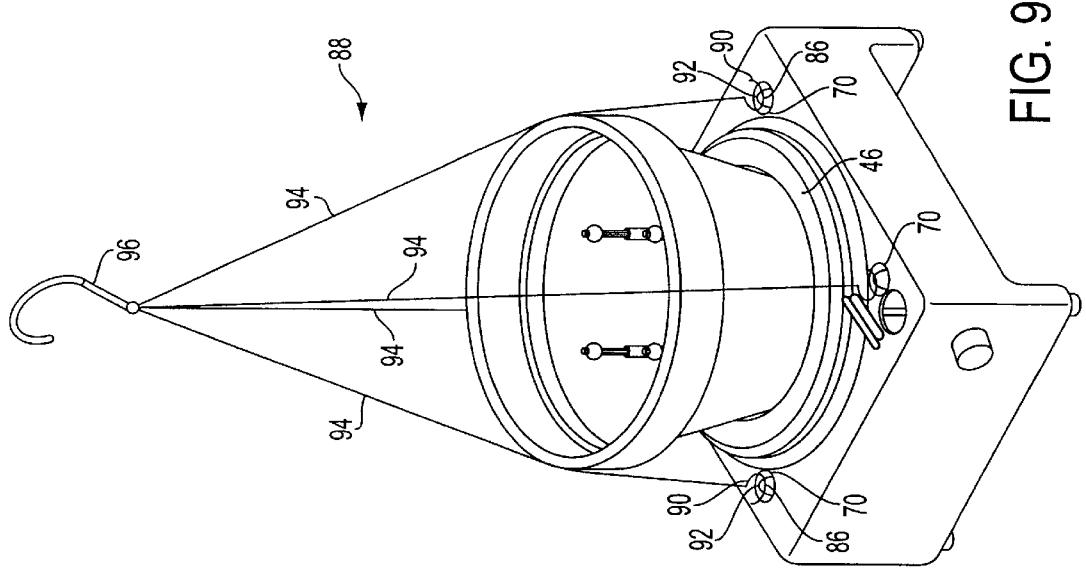
FIG. 9 is an elevated perspective of the water storage device with the hanging mechanism attached showing particularly the external portions of the hanging mechanism.

Referring to FIGS. 7, 8, and 9, when it is desired to hang the pot with wicks and water storage device, the potted plant with regulating wick device is removed from the water storage device 42 and set aside sitting on the wick element clamp's pot stand, 34. The interior pot support 78 is placed through the top opening of the water storage device 42. The legs 82 are turned upward toward the grommet openings 70, best viewed in FIG. 9, and the loop connections 86 are pinched and threaded through the grommet connections 70 in the reservoir's corners as far as the leg expansions 84 will allow. The grommets 70 connect the gasket-retaining ring 66 to the top of the water storage device 42. The loop connections 86 are held in place through the grommets by C-hooks 90 and retained on the C-hooks by loop retaining seats 92. At this point it may be convenient to replace the clay pot, plant, and regulating wick device back into the water storage device 42, carefully positioning the wick clamp pot stand 34, over the pot seat 80. The exterior wire hanging legs 94 are connected to the C-hooks 90. The hanging legs 94 are also connected to the hanging hook 96. The hanging hook 96 may now hang the device with potted plant.

With the hanging assembly illustrated in FIG. 8 the planting pot 6, moist soil 4, plant 2 which is not shown, and the regulating wick device 10 are supported by the wire hanging mechanism 76. The water storage device 42 with water level 08, not shown, hang on the leg expansions 84 beneath the gasket retaining ring outside the circumference of the raised lip 46 of the reservoir.

Note that the interior pot support 78 may be triangular or pentagonal or other shape, depending on how many attachment points are needed around the gasket retaining ring 66.

Note also the exterior hanger 88 is preferably of a rigid nature so that the hanging water storage device 42 may be handled from the bottom with a pole device and platform. Referring to FIG. 10 and further discussed below, the pole device preferably has a platform shaped like a short version of the alignment plank 100, and a perpendicular weight retaining ridge.

FIGS. 10 and 11 illustrate alternate forms for preferred methods of alignment. The alignment mechanisms include combining a plurality of potted plants in water storage devices for window box designs, patio borders and other alignment uses. Preferably, the water storage device exhibits a cubic nature and a smooth design, so that a plurality of devices aligned contiguously form the appearance of window boxes, patio borders, or decorative designs and borders. Use of different colored devices form decorative tile-like patterns. Referring to FIG. 10, the alignment is formed with the alignment mechanism 98. An alignment plank 100 is easily constructed of treated wood, plastic, laminated particleboard or other material sufficiently strong to hold the plurality of devices. Strategically positioned in the alignment plank 100 are holes 102 accommodating the reservoir well 62 of the cubic reservoir 44. Placing the reservoir 44 on the alignment plank 100, taking care to fit the reservoir well 62 into the holes 102, forms a smooth uninterrupted window box shape. In a like manner alignment mechanisms may be used for other types of decorative borders.

In FIG. 11 the alignment mechanism is basically the same as FIG. 10 with the exception of the reservoir well 62 which is threaded and held in place through a larger hole 102 in the alignment plank 100 by a female nut 104 beneath the plank. Other means of attachment will be readily apparent. With this alternate form of the alignment mechanism 98 the water storage device is secured below the plank. This feature may be useful if there is any occasion to slant the plank, for example for use with casement windows. The larger alignment holes 102 may also make it easier to slide overflowing pots into alignment.

Figure 14:
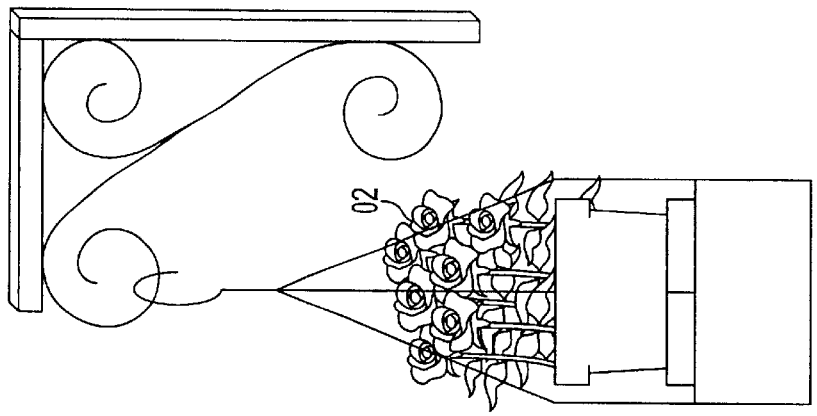
FIG. 14 illustrates yet another of the flexible exemplary uses of the modular plantings using the water storage device.
Figure 13:
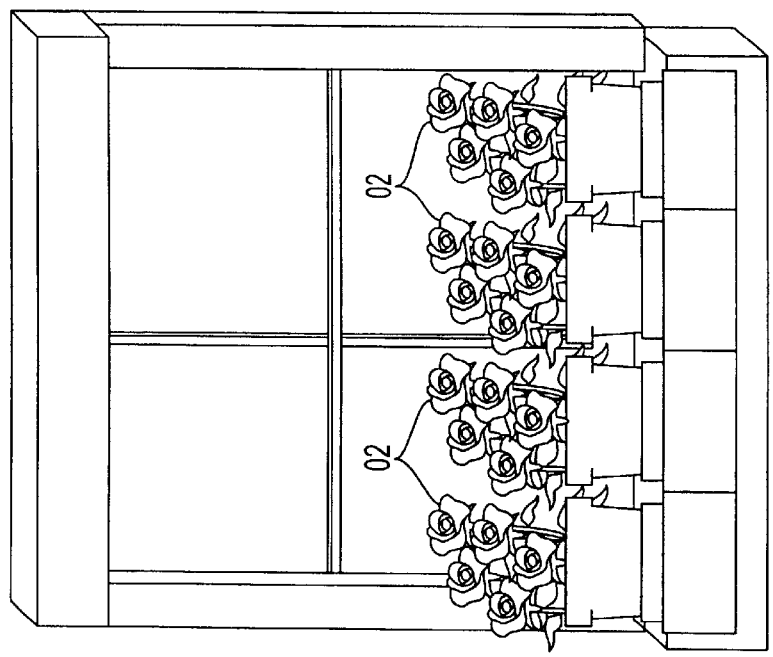
FIG. 13 illustrates another of the flexible exemplary uses of the modular plantings using the water storage device.
Figure 12:
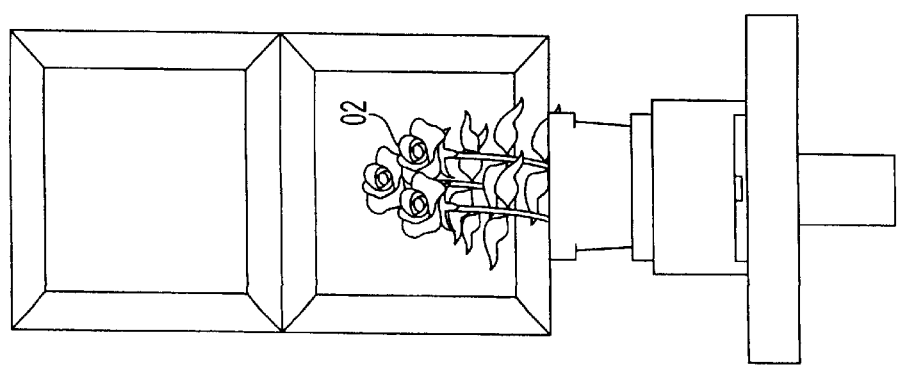
FIG. 12 illustrates one of the flexible exemplary uses of the modular plantings using the water storage device.

FIGS. 12, 13, and 14 summarize the expanded utility of the common inexpensive clay pot. The pot can now be placed on fine furniture, illustrated in FIG. 12. It can be aligned as window boxes or other designs as illustrated in FIG. 13. Finally the clay pot can be hung as illustrated in FIG. 14. Moreover the plantings can be rotated to new modes of setting about the home without repotting the plant. For example, a window box planting may be brought indoors to use as a center piece in a table setting or vice versa. The porous clay pot has also been transformed into a low maintenance planting container with available water storage for use with a wick device.

Figure 15:
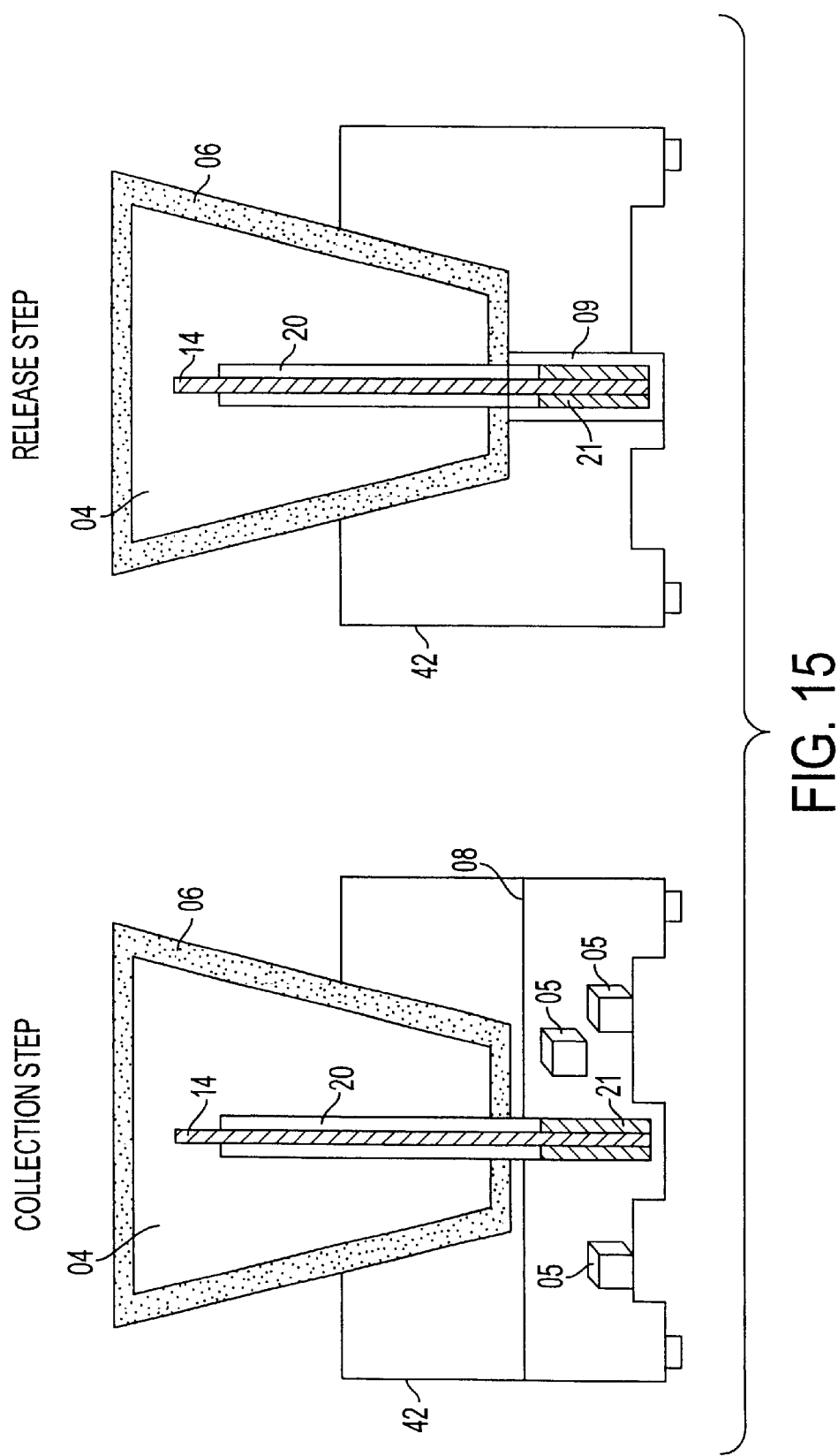
FIG. 15 illustrates an application of the nutrient addition method of the present invention in physical terms with planting pot, reservoir, wick device and insoluble nutrients.

FIG. 15 illustrates the two step collection and release process of cationic nutrients in physical terms. In both steps there is a planting pot 06 containing soil or growing medium 04. Both steps illustrate the same wick device which includes a moisture conducting wicking material which has preferably been chemically treated as a cation exchanger 14. Filter companies like Whatman manufacture chromatography papers such as cellulose bonded with phosphate groups, Whatman P81 Cellulose Phosphate Chromatography Paper, or cellulose loaded with silica gel which in turn are bonded with sulfonate groups. Alternately the wick could be a column of silica or resins bonded with negatively charged groups. Since moisture wicking is the only flow mechanism available as mobile phase, the chemical bonding should be adapted for this purpose. However collection, not separation, of cations is the only objective. Most current materials treated in this way are delicate. Therefore, the wick element also includes a casing 20 of stainless tubing or appropriate plastic which encloses the wick throughout the lower soil. A mesh or membrane 21 preferably surrounds the lower portion of the chemically treated wicking material which is immersed in the liquid nutrient reservoir. The mesh or membrane covering 21 excludes solids in the reservoir but allows the dissolved cations attracted to the wick's negatively charged sites there through. Note that an alternate way of keeping the wicks from fouling with solids is to package the insoluble rock powder in a mesh or membrane. This keeps the entire liquid in the reservoir free of small solids particles.

The potted plant with protruding special wick is positioned above a reservoir 42, to which pure water at level 08, and to which the relatively insoluble nutrient solids 05 have been added. This configuration, called the collection step, is in place for a relatively long period of time. These cationic nutrient conducting wicks can be used simultaneously with moisture conducting wicks, such as microfiber wicks, which provide pure moisture conductance. Moisture conductance has been discussed previously.

After a period of adding moisture and collecting cations on the wick, the release phase is commenced. Physically this is achieved by placing the bottom of the wick in a release solution 09 of relatively high ionic strength. A suitable solution may be one of potassium dihydrogen phosphate buffer at a suitable pH, perhaps between 6 and 7. This step is relatively short in duration and does not take a large volume of solution. The numerous potassium and hydrogen cations in the release solution quickly exchange the collected cations on the wick and drive the nutrients up to the negatively charged soil 04. Gravity and the cation exchange capacity of the soil distribute the accessible nutrients to the plant roots.

Figure 16:
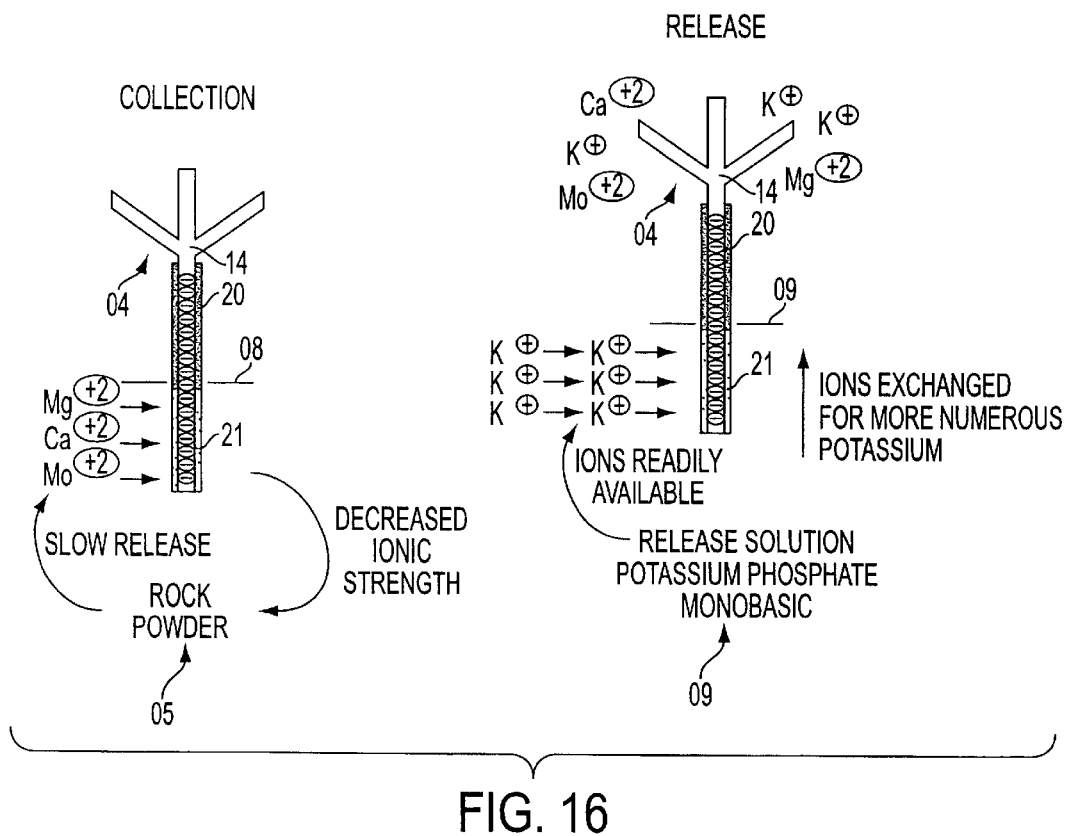
FIG. 16 illustrates an application of the nutrient addition method in chemical terms with nutrient dissociation, collection, ion exchange and release of cations to the soil.

FIG. 16 illustrates the method in chemical terms. As illustrated in FIG. 16, the wicks are in contact with the soil 04 and the liquid nutrient surface 08. For ease of illustration only the wick construction and, nutrient conductance process is shown. During the collection phase the insoluble solids slowly dissolve and are dissociated into ions, specifically cations shown by way of example $Mg^{+2}$, $Ca^{+2}$, $Mo^{+2}$. The cations are attracted to the wick and adhere to its negatively charged sites. The positively charged cations are exchanged up the negatively charged wick as moisture is conducted upward. Removal of the cations out of solution decreases its ionic strength and encourages more dissociation according to Le Chatelier's Principle. Slowly the cations may move upward into the soil with the wicking action only, however a release phase may be commenced.

During the release phase the potassium dihydrogen phosphate solution has readily available numerous potassium and hydrogen cations which are also attracted to the negative sites in the wick. Immersion of the wick 14 in casing 20 deep into the solution increases the wicking capacity and these cations quickly exchange the collected cations on the wick and drive them upward into the soil 04. Potassium and hydrogen are also essential plant nutrients and not harmful as long as the proper pH is maintained in the soil. Buffer solutions by their very nature control pH through the release process. Other releasing solutions can be formulated of citrate or sorbate which are organic and also can act as antimicrobials. Still others will be readily apparent to those skilled in the art.

The method of nutrient conductance described above is practical if wicks and reservoirs are already being used to maintain the moisture of a containerized houseplant. The wick holder preferably positions several "wicking elements" which conduct moisture. These elements are encased into the upper soil and are actually adjusted from the top of the soil. One can visualize a holder with three moisture conducting wicks and one nutrient conducting wick. The collection phase proceeds simultaneously with the addition of moisture to the plant. Between water fills to the reservoir, or before cleaning the reservoir, a release phase is begun by pulling the moisture wicks above the low liquid surface and installing a cup of release solution in which only the nutrient wick, perhaps too delicate to move, is immersed high up onto its casing for maximum flow upward. The cup of release solution is removed after this phase and the reservoir filled as usual with water.

In this way the plant is regularly bathed in low levels of nutrients which avoids the feast or famine addition procedures often used. The procedure is gentle enough not to burn the plant, yet more rapid than the decomposition of insoluble nutrients in the soil.

The regulating wick device presented has the advantage of introducing moisture in the top of the growing medium for distribution throughout more available rooting layers of potted soil. The simple sliding action of the wick elements within its holding device sets the moisture delivery capacity to rates conducive for maintaining a specific plant within the maintenance schedule of a specific caregiver. Finally, the regulating wick device using the straight wick elements provide for modulation of moisture delivery rates after the plant has been potted substantially without disturbing either potting soil or plant roots. The modulating adjustments can be conveniently made in the accessible upper soil by sliding the upper wick casing up or down to slow or increase the moisture delivery rate as desired.

Working together the regulating wick device and the water storage device offers modularity to plant a container and provide the soil and moisture conditions optimum for the specific plant. Working together they provide flexibility to use the planting in all the ways plantings can be set around the home. Finally working together they provide self containment with available water, and a slow delivery system designed for easy maintenance. With modularity, flexibility, and self containment the art of houseplant maintenance is greatly advanced to the point of facilitating indoor/outdoor rotation of houseplants. For the first time it may be practical to enjoy the occasional, proximate, indoor use of blooming, fragrant, sun loving plants.

What is claimed is:

1. A water storage device usable with a wick device inserted into and extending from the bottom surface of a planting pot usable with means of securely coupling planting pots of variable sizings within said water storage device, usable with means for orderly contiguous alignment of a plurality of said water storage devices with secured potted plants, and usable a means for elevation comprising:

a planting pot;

a housing including an interior which forms a reservoir in said housing for sealingly holding liquid nutrients;

a top comprising an opening therein which communicates said reservoir with the exterior of said housing;

an elastic compliant member defining a plane, positioned around said top opening, through which said planting pot is received and held, a portion of the planting pot passing entirely though the plane of said compliant member, said compliant member supporting the planting pot inside said reservoir in a secured upright manner, said compliant member having an exterior shape similar to the said housing top opening;

an interior shelf below the plane of the compliant member for supporting the bottom of said compliant member;

an alignment mechanism in the bottom of said water storage device for aligning a plurality of said water storage devices with secured potted plants contiguously on a horizontal plane;

a plurality of elevated support members on the bottom of said device of substantially equal length to support the bottom of said water storage device to space apart the moisture containing housing from the setting surface;

a drainage portal in the side of said housing positioned to maintain a predetermined water level;

a liquid nutrient addition portal substantially above the predetermined water level for permitting the addition of liquid nutrients directly into the reservoir; and a raised lip around the top opening in a plane parallel to said interior shelf for supporting said compliant member between the lip and the interior shelf, wherein the interior shelf comprises a retaining ring of sufficient width to both provide bottom support for the said compliant member and to connect to the interior surface of the top plane of said water storage device forming an upper support for an interior hanging mechanism for the water storage device.

2. The water storage device according to claim 1, further comprising a closure for said drainage portal, which is substantially clear and functions as a fill level sight in the side of the base.

3. The water storage device according to claim 1, further comprising a means for hanging said water storage device with said planting pot secured therein.

4. The water storage device according to claim 1, wherein both the top plane of the reservoir and said retaining ring have aligned and connected openings through which hanging fixtures may pass.

5. The water storage device according to claim 4, further comprising an interior pot support for hanging the potted plant, having a pot seat, connecting legs with leg expansions positioned beneath said aligned and connected openings, and hanging fixtures which fit through the aligned and connected openings.

6. The water storage device according to claim 1, wherein said compliant member has an interior bevel with gradient sufficient to both fit exterior planting pot and to accommodate variances within nominal standard pot sizes.

7. The water storage device according to claim 1, wherein said compliant member contains a means for aeration around and through the compliant member.

8. The water storage device according to claim 7, wherein the means for aeration comprises a structure selected from the group consisting of scallops or air pockets.

9. The water storage device according to claim 1, wherein the alignment mechanism comprises a well in the bottom plane of the reservoir which fits an opening in an alignment plank.

10. The water storage device according to claim 9, further comprising at least one drainage trough in the bottom plane of the reservoir which empties into said bottom well such that the liquid nutrient contained is efficiently used by a wick device.

11. The water storage device according to claim 9, wherein said well in the bottom plane of the water reservoir further comprises an attachment means such that the water storage device can be secured beneath said alignment plank.

12. A water storage device usable with a wick device inserted into and extending from the bottom surface of a planting pot usable with means of securely coupling planting pots of variable sizings within said water storage device, usable with means for orderly contiguous alignment of a plurality of said water storage devices with secured potted plants, and usable a means for elevation comprising:
 a planting pot;
 a housing including an interior which forms a reservoir in said housing for sealingly holding liquid nutrients;
 a top comprising an opening therein which communicates said reservoir with the exterior of said housing;
 an elastic compliant member defining a plane, positioned around said top opening, through which said planting pot is received and held, a portion of the planting pot passing entirely through the plane of said compliant member, said compliant member supporting the planting pot inside said reservoir in a secured upright manner, said compliant member having an exterior shape similar to the said housing top opening;
 an interior shelf below the plane of the compliant member for supporting the bottom of said compliant member;
 an alignment mechanism in the bottom of said water storage device for aligning a plurality of said water storage devices with secured potted plants contiguously on a horizontal plane;
 a plurality of elevated support members on the bottom of said device of substantially equal length to support the bottom of said water storage device to space apart the moisture containing housing from the setting surface;
 a drainage portal in the side of said housing positioned to maintain a predetermined water level; and
 a liquid nutrient addition portal substantially above the predetermined water level for permitting the addition of liquid nutrients directly into the reservoir
 wherein said compliant member contains a means for aeration around and through the compliant member.

13. The water storage device according to claim 12, further comprising a closure for said drainage portal, which is substantially clear and functions as a fill level sight in the side of the base.

14. The water storage device according to claim 12, further comprising a means for hanging said water storage device with said planting pot secured therein.

15. The water storage device according to claim 12, further comprising:
 a raised lip around the top opening in a plane parallel to said interior shelf for supporting said compliant member between the lip and the interior shelf, wherein the interior shelf comprises a retaining ring of sufficient width to both provide bottom support for the said compliant member and to connect to the interior surface of the top plane of said water storage device forming an upper support for an interior hanging mechanism for the water storage device; and
 wherein both the top plane of the reservoir and said retaining ring have aligned and connected openings through which hanging fixtures may pass.

16. The water storage device according to claim 15, further comprising an interior pot support for hanging the potted plant, having a pot scat, connecting legs with leg expansions positioned beneath said aligned and connected openings, and hanging fixtures which fit through the aligned and connected openings.

17. The water storage device according to claim 12, wherein said compliant member has an interior bevel with gradient sufficient to both fit exterior planting pot and to accommodate variances within nominal standard pot sizes.

18. The water storage device according to claim 12, wherein the means for aeration comprises a structure selected from the group consisting of scallops or air pockets.

19. The water storage device according to claim 12, wherein the alignment mechanism comprises a well in the bottom plane of the reservoir which fits an opening in an alignment plank.

20. The water storage device according to claim 19, further comprising at least one drainage trough in the bottom plane of the reservoir which empties into said bottom well such that the liquid nutrient contained is efficiently used by a wick device.

21. The water storage device according to claim 19, wherein said well in the bottom plane of the water reservoir further comprises an attachment means such that the water storage device can be secured beneath said alignment plank.

22. A water storage device usable with a wick device inserted into and extending from the bottom surface of a planting pot usable with means of securely coupling planting pots of variable sizings within said water storage device, usable with means for orderly contiguous alignment of a plurality of said water storage devices with secured potted plants, and usable a means for elevation comprising:

- a planting pot;
- a housing including an interior which forms a reservoir in said housing for sealingly holding liquid nutrients;
- a top comprising an opening therein which communicates said reservoir with the exterior of said housing;
- an elastic compliant member defining a plane, positioned around said top opening, through which said planting pot is received and held, a portion of the planting pot passing entirely through the plane of said compliant member, said compliant member supporting the planting pot inside said reservoir in a secured upright manner, said compliant member having an exterior shape similar to the said housing top opening;
- an interior shelf below the plane of the compliant member for supporting the bottom of said compliant member;
- an alignment mechanism in the bottom of said water storage device for aligning a plurality of said water storage devices with secured potted plants contiguously on a horizontal plane;
- a plurality of elevated support members on the bottom of said device of substantially equal length to support the bottom of said water storage device to space apart the moisture containing housing from the setting surface;
- a drainage portal in the side of said housing positioned to maintain a predetermined water level;
- a liquid nutrient addition portal substantially above the predetermined water level for permitting the addition of liquid nutrients directly into the reservoir; and
- wherein the alignment mechanism comprises a well in the bottom plane of the reservoir which fits an opening in an alignment plank.

23. The water storage device according to claim 22, further comprising a closure for said drainage portal, which is substantially clear and functions as a fill level sight in the side of the base.

24. The water storage device according to claim 22, further comprising a means for hanging said water storage device with said planting pot secured therein.

25. The water storage device according to claim 22, further comprising:

- a raised lip around the top opening in a plane parallel to said interior shelf for supporting said compliant member between the lip and the interior shelf, wherein the interior shelf comprises a retaining ring of sufficient width to both provide bottom support for the said compliant member and to connect to the interior surface of the top plane of said water storage device forming an upper support for an interior hanging mechanism for the water storage device; and
- wherein both the top plane of the reservoir and said retaining ring have aligned and connected openings through which hanging fixtures may pass.

26. The water storage device according to claim 25, further comprising an interior pot support for hanging the potted plant, having a pot seat, connecting legs with leg expansions positioned beneath said aligned and connected openings, and hanging fixtures which fit through the aligned and connected openings.

27. The water storage device according to claim 22, wherein said compliant member has an interior bevel with gradient sufficient to both fit exterior planting pot and to accommodate variances within nominal standard pot sizes.

28. The water storage device according to claim 22, wherein said compliant member contains a means for aeration around and through the compliant member; and wherein the means for aeration comprises a structure selected from the group consisting of scallops and air pockets.

29. The water storage device according to claim 22, further comprising at least one drainage trough in the bottom plane of the reservoir which empties into said bottom well such that the liquid nutrient contained is efficiently used by a wick device.

30. The water storage device according to claim 22, wherein said well in the bottom plane of the water reservoir further comprises an attachment means such that the water storage device can be secured beneath said alignment plank.

* * * * *